United States Patent [19]
Patel et al.

[11] Patent Number: 6,086,264
[45] Date of Patent: Jul. 11, 2000

[54] FIBER-COUPLED LASER DEVICE USING SQUARE CROSS SECTION FIBERS AND METHOD FOR FABRICATION

[75] Inventors: Rushikesh M. Patel; Robin R. Pleak; Sheng-hui Yang, all of Tucson, Ariz.

[73] Assignee: Opto Power Corporation, Tucson, Ariz.

[21] Appl. No.: 08/991,477

[22] Filed: Dec. 16, 1997

[51] Int. Cl.⁷ .................................................. G02B 6/36
[52] U.S. Cl. .............................. 385/89; 385/92; 385/33; 385/93; 385/83; 385/147
[58] Field of Search ............................ 385/88–94, 33, 385/34, 35, 83, 147

[56] References Cited

U.S. PATENT DOCUMENTS

| | | | |
|---|---|---|---|
| 5,175,783 | 12/1992 | Tatoh | 385/93 |
| 5,764,826 | 6/1998 | Kuhara et al. | 385/24 |
| 5,859,942 | 1/1999 | Ueda | 385/49 |

*Primary Examiner*—Hung N. Ngo
*Attorney, Agent, or Firm*—Herbert M. Shapiro

[57] ABSTRACT

Square cross section optical fibers are accurately positioned for coupling light from laser diode emitting facets through a fiber lens. The fibers are placed in parallel channels formed in a photolithographic layer on a planar surface of a substrate and constrained in place by a retention plate. The fibers extend beyond the retention plate unrestrained by photoresist but overlying the exposed portion of the planar surface of the substrate. The fibers over the exposed portion are cemented in place and the photoresist layer is then removed leaving the constrained portion of the fibers in very accurately defined positions, and free of epoxy cement, for abutment to the familiar fiber lens.

6 Claims, 3 Drawing Sheets

FIBER-COUPLED LASER DEVICE USING SQUARE CROSS SECTION FIBERS AND METHOD FOR FABRICATION

FIELD OF THE INVENTION

This invention relates to laser diodes and more particularly to fiber-coupled laser diodes and laser diode bars.

BACKGROUND OF THE INVENTION

Laser diodes and laser diode bars are available commercially with a fiber lens which collimates light from the lasing emitters or the diode emitting facet. The light from the emitters is then coupled into the ends of optical fibers coupled to the lens. For laser bars in particular, the optical fibers are round in cross section and are epoxy cemented into V-shaped grooves etched into the surface of a planar member and capped.

The positions of such fibers in V-shaped grooves frequently vary, one from another, and the epoxy cement often causes unwanted movement in the position of the fibers in the grooves. The result of such variation in the position of the fiber end is a reduction in efficiency of the diodes. Accordingly, a problem exists in providing a fiber-coupled laser diode device in which the positions of the fiber ends is more consistent and more accurately controlled.

BRIEF DESCRIPTION OF THE INVENTION

In accordance with the principles of this invention, optical fibers are positioned on the planar surface of a rigid substrate. The fibers are arranged in parallel channels fromed in a photoresist coating overlying the planar surface. The ends of the fibers are aligned with an edge of the planar surface and a planar retention member is abutted against the top of the front section of the fibers, sandwiching the fiber ends between the planar surface and the retention member.

The photoresist defines parallel channels only between the planar surface and the retention member. The fibers need not be in parallel in the exposed space overlying the remainder of the planar surface. The fibers at the exposed space are epoxy-cemented in place. Then the photoresist is dissolved leaving the ends of the fibers, at the edge of the planar surface, in fixed positions and undisturbed by heating effects on the epoxy cement.

The fiber ends are coupled to a fiber lens for coupling light from associated lasing emitters into corresponding fibers.

DETAILED DESCRIPTION OF AN ILLUSTRATIVE EMBODIMENT OF THIS INVENTION

Figure 1:
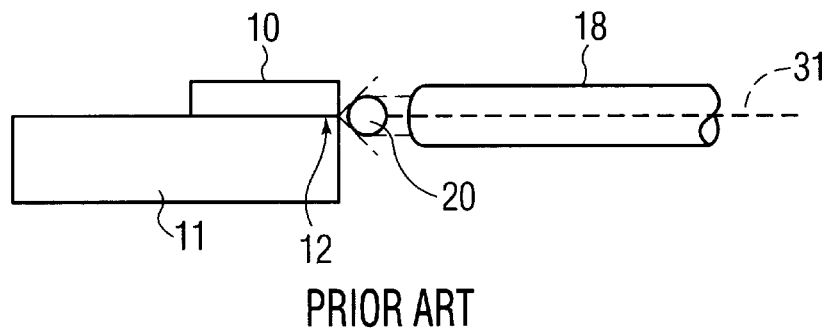
FIG. 1 is a side view of a fiber coupled laser bar arrangement.

FIG. 1 shows a prior art arrangement of a laser bar 10 having a plurality of lasing emitters represented, in side view, by numeral 12. The laser bar is mounted on a heat sink 11. The radiation emitted by the lasing emitters is coupled into a multimode optical fiber arrangement represented by fiber 18. A microlens 20 is positioned between the facet and the fiber end(s) as shown. For a single emitter, only one fiber is present. For a laser bar, a fiber for each emitter on the facet is present. The microlens (20) is operative to collimate the light from the emitters for coupling into the associated fiber.

Figure 2:
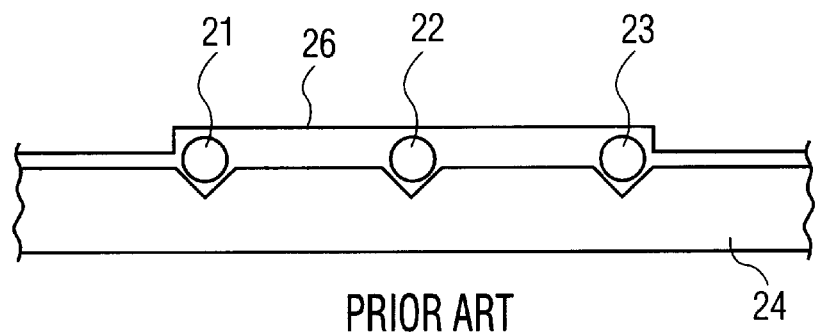
FIG. 2 is a schematic front view of a prior art arrangement of optical fibers for coupling to the laser bar of FIG. 1.

FIG. 2 shows a typical prior art arrangement for the optical fibers of FIG. 1. Illustratively, three fibers, 21, 22, and 23, are shown. The fibers are positioned in associated V-shaped grooves etched into a rigid support 24. The fibers are epoxy cemented into the grooves and a retention member 26 is placed over the fibers.

Figure 3:
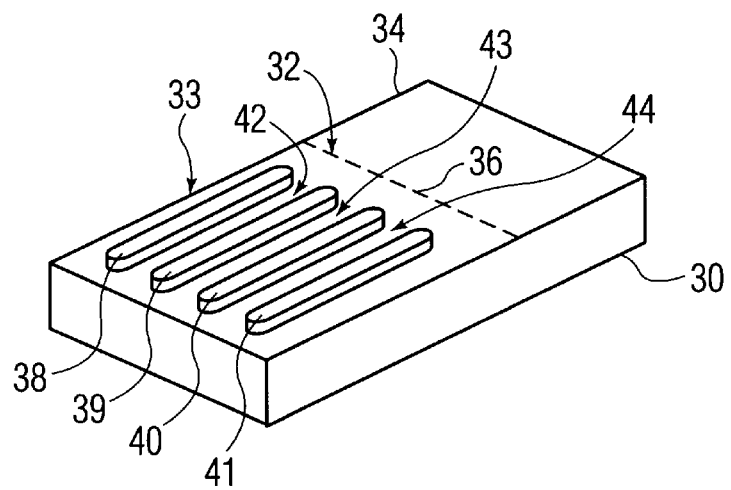
FIG. 3 is a perspective view of a portion of the optical fiber arrangement for coupling to the laser bar of FIG. 1 in accordance with the principles of this invention.

In accordance with the principles of this invention, the fibers are placed and constrained in position which are not effected by epoxy cement curing and are more consistently accurate in placement. Specifically, FIG. 3 shows an elongated support member 30 having a long dimension aligned with the optical axis 31 of FIG. 1. The support has a planar top surface divided into first and second sections 33 and 34.

Optical fibers are arranged on surface 32 in positions parallel to the optical axis and separated from one another in positions to match the separation of emitters in laser bar 10 of FIG. 1. But in accordance with the principles of the present invention, the fibers are square or rectangular in cross section rather than round as is the case in prior art devices. Moreover, the position of the fibers is determined by a pattern of photoresist which define slots for the fibers.

Figure 4:
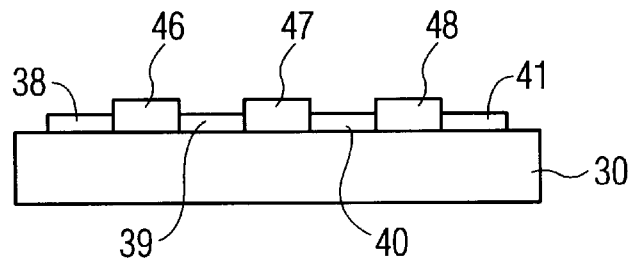
FIGS. 4 and 5 are front views of alternative optical fiber arrangements in accordance with the principles of this invention.
Figure 5:
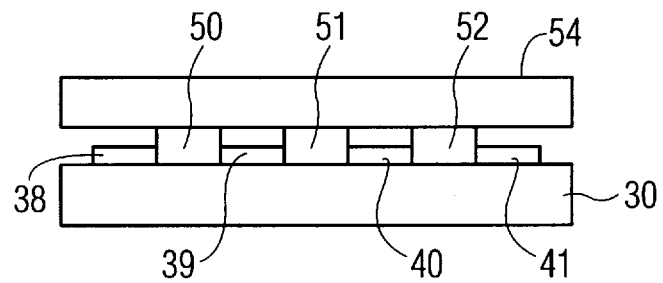

FIG. 3 shows a pattern of photoresist mesas 38, 39, 40, and 41 which define slots 42, 43, and 44 for receiving fibers. FIG. 4 shows a front view of the support member 30 of FIG. 3 with the photoresist mesas in place with rectangular cross section fibers 46, 47, and 48 in slots 42, 43, and 44 respectively. FIG. 5 shows the same view with square cross section fibers 50, 51, and 52 in the slots.

Figure 6:
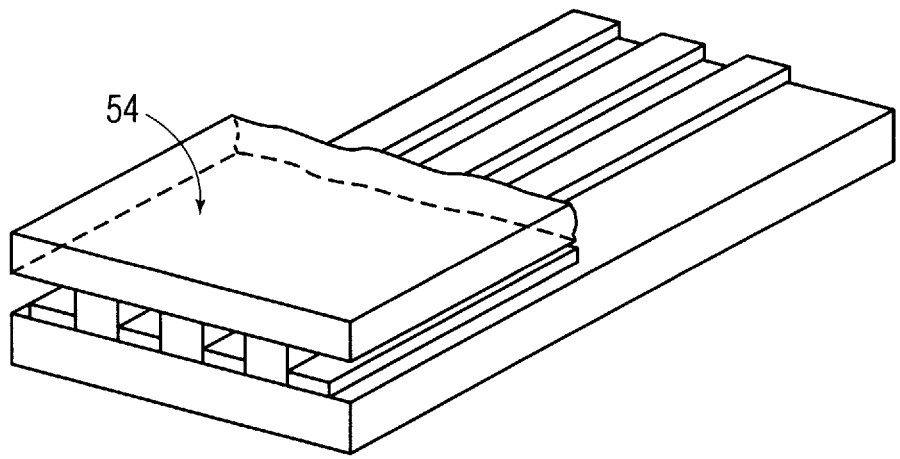
FIG. 6 is a perspective view of a completed optical fiber arrangement in accordance with the principles of this invention.

The fibers are constrained by a retention member 54 shown in FIGS. 5 and 6. The retention member is placed only over section 33 of planar surface 32 (viz: FIG. 3). But the fibers extend along the entire surface of the support member. The portions of the fibers over section 34 are epoxy cemented in place. Thereafter, the photoresist mesas are removed leaving the fiber ends accurately and consistently positioned for abutment to a microlens (20) as shown in FIG. 1.

Figure 7:
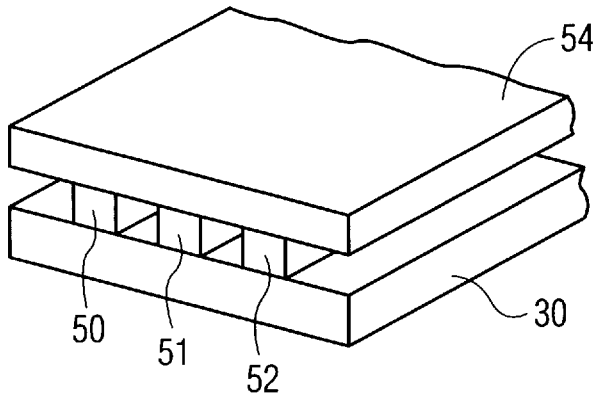
FIG. 7 is a front view of the arrangement of FIG. 6.

FIG. 7 shows a front view of the arrangement of FIG. 6 showing square cross section fibers in the absence of the photoresist mesas.

Figure 8:
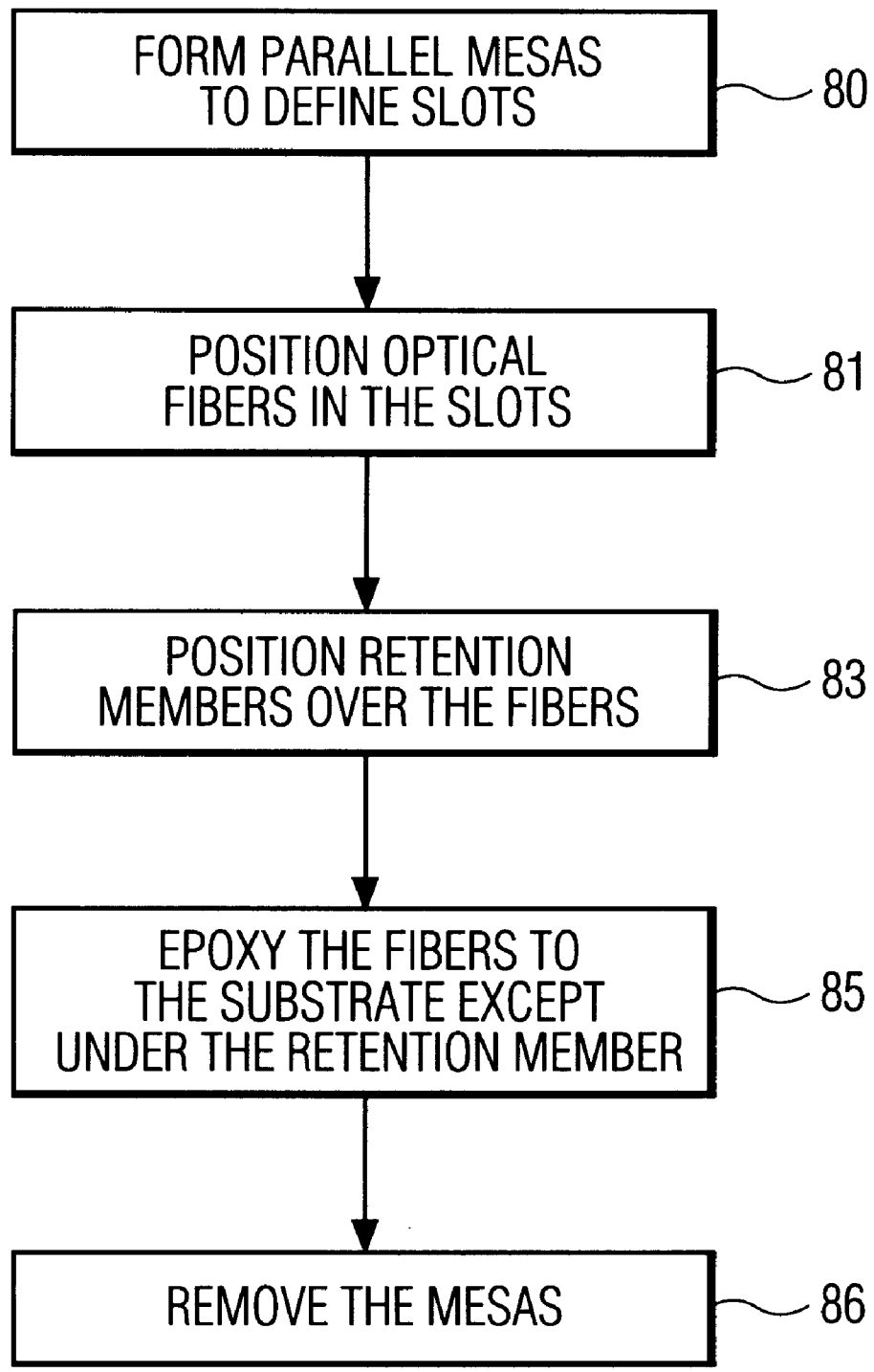
FIG. 8 is a flow diagram of the method for fabricating the arrangement of FIG. 6.

FIG. 8 is a flow diagram of the method for fabricating the laser diodes of FIGS. 4 and 5. The first step is to form by photolithography a plurality of photoresist mesas on the front section of the planar top surface of a support member as represented by block 80 in FIG. 8.

The next step is place fibers having a square or rectangular cross section into slots defined by the mesas as indicated by block 81. The third step is to secure a retention member over the position of the fibers in the slots as indicated by block 83.

Next, the positions of the fibers extending beyond the retention member are epoxy cemented to the top surface of the support member as indicated by block 85.

The final step is to remove the photoresist mesas as indicated by block 86. The fiber ends are now consistently positioned at the front face of support member for abutment against a microlens for coupling light from the emitters of a laser bar (or diode) in the absence of epoxy cement at those ends.

The fibers used in accordance with the principles of this invention are either square or rectangular in cross section, "square" being a special case of the term "rectangular" where all the sides are equal.

What is claimed is:

1. A laser diode device comprising at least one lasing emitter on an emitting facet, said device having a microlens aligned with an axis of said facet and energy coupled thereto for collimating light emitted from said emitter, said device also including at least one optical fiber having a rectangular cross section, said fiber being sandwiched in place between a planar surface of a substrate and a retention member, the end of said fiber being unconstrained by epoxy cement and aligned for coupling light from said lasing emitter.

2. A device as in claim 1 comprising a plurality of lasing emitters on said emitting facet, said fiber lens being coupled thereto for collimating light from said emitters, said device including a plurality of optical fibers, each having a rectangular cross section, said fibers being sandwiched in place with ends thereof having light from corresponding emitters coupled into them.

3. A device as in claim 1 wherein the sides of said rectangular cross section are equal to one another.

4. A device as in claim 2 wherein the sides of said rectangular cross section are equal to one another.

5. A method for fabricating a laser diode device, said method comprising the steps of forming a plurality of spaced apart mesas on the front section of the planar surface of a support member having front and back sections, positioning rectangular cross section optical fibers in the slots defined between adjacent ones of said mesas, constraining said fibers in said slots by placing a retention member thereover, cementing the fibers extending over said rear section to said planar surface there, removing said mesas, and placing the front edge of said support member in alignment with a laser diode such that the fiber ends at said front edge align with emitters on the facet therein.

6. A method as in claim 5 wherein said mesas are formed by photolithography processes in a photoresist layer, and said mesas are removed by dissolving said photoresist layer.

* * * * *